United States Patent [19]
Bailiff

[11] 3,747,945
[45] July 24, 1973

[54] UNIVERSAL RING JAWS

[76] Inventor: Vernon Brooks Bailiff, 3608 W. Harmont Dr., Phoenix, Ariz. 85021

[22] Filed: Oct. 4, 1971

[21] Appl. No.: 185,972

[52] U.S. Cl................ 279/1 SJ, 279/110, 279/123, 29/559

[51] Int. Cl............................................ B23b 31/10

[58] Field of Search..................... 279/1 SJ, 110, 123

[56] References Cited
FOREIGN PATENTS OR APPLICATIONS
104,488  3/1917  Great Britain...................... 279/123

Primary Examiner—Francis S. Husar
Attorney—William C. Cahill et al.

[57] ABSTRACT

The invention describes apparatus for chucking work in lathes. A pie-shaped, segmented, planar backing plate is attached to a lathe in such a manner as to permit radial movement without affecting the planar orientation of each of the segments. A plurality of segments constituting a ring are attached to the backing plate. This ring is machined to accept the work piece in either an inside diameter or outside diameter relationship. After the work piece is mounted onto the segmented ring, the segments of the backing plate are moved radially inwardly or outwardly, depending on the method of attaching the work piece, to snugly hold the work piece during the machining operation of the work piece. The size of the backing plate is constricted only by the peripheral equipment about the lathe and is not related to the size of the lathe chuck jaws themselves. Similarly, the size of the segmented ring employed with the backing plate is determined by the inside or outside diameter of the portion of the work piece used in securing the work piece to the segmented ring.

6 Claims, 5 Drawing Figures

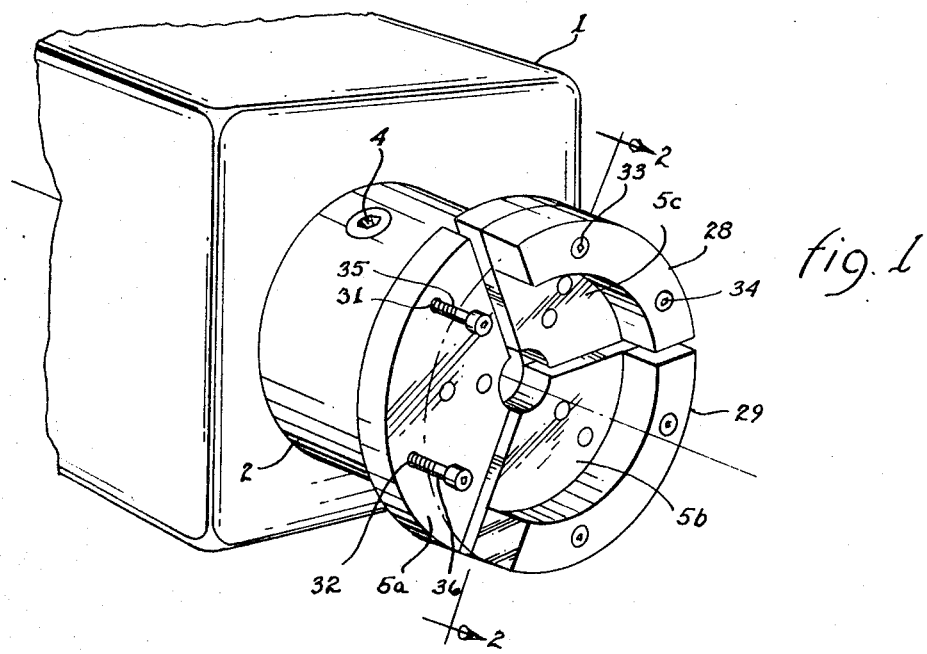
fig. 1
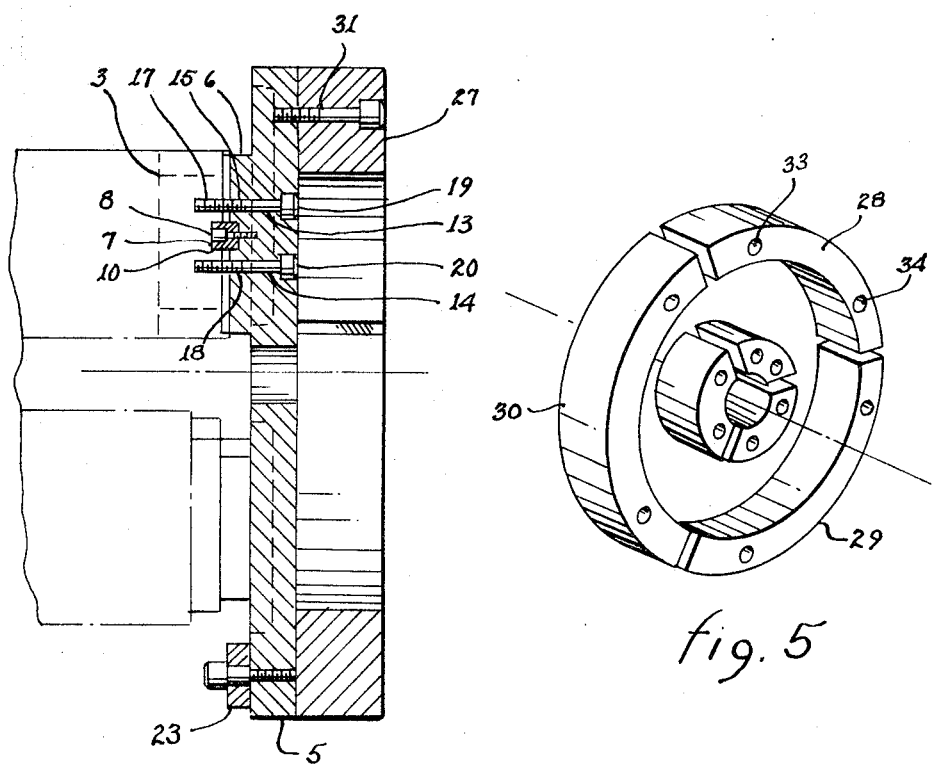
fig. 2
fig. 5

UNIVERSAL RING JAWS

This invention relates to devices useful in expansively or contractively attaching work pieces to lathes.

In the prior art, various methods have been used to attach work pieces to lathes. Initially, a slit collet was used to directly hold the work piece and on occasion it had to be machined to fit. This machining operation was expensive as the collets were of hardened material. Once machined, the collets were adapted to fit only work pieces of that particular diameter, unless further enlarged. After the collets had been machined to the point where the metal remaining in the periphery was insufficient to form the chucking jaws for the work piece, the collets had to be discarded. The attendant replacement costs further increased the costs of the machining operation.

To overcome the above-described collet machining and replacement costs, pie-shaped chuck jaws of soft material, such as aluminum, were bolted onto the respective slit portions of the collet. With this configuration, the aluminum chuck jaws, rather than the collet, were machined to fit and hold the work piece. This method saved the cost of machining the hardened collets and their replacement, but introduced further and different problems. The aluminum chuck jaws were of uniform thickness from their center to their periphery. To hold a work piece, the chuck jaws had to be machined either from the center outwardly or from the periphery inwardly, depending on whether the work piece was to be held by expanding against an inside diameter or contracting against an outside diameter of the work piece. As with the prior machining of the collets, once the chuck jaws have been machined, further utility was predicated on future work pieces being of lesser or greater diameter, depending on whether the work piece is held contractively or expansively. In many situations, the machining operation in preparing the chuck jaws removed a large portion of the material and thus severely limited its future usefulness. For dish-shaped work pieces, where the dished portion is to be imbedded within the chuck jaws, a large amount of material at the center of the chuck jaws must be removed. The setting up time required for so preparing the chuck jaws is expensive and limits the future usefulness of the chuck jaws.

In situations requiring the machining of hard work pieces, such as Hastalloy or Waspalloy, the chuck jaws must be tightened to a greater-than-normal extent to retain the work piece on the chuck jaws in a non-sliding relationship. This additional tightening will tend to bend or distort the aluminum chuck jaws due to the leverage arm between the collet attachment and the point of attaching the work piece. Distortion of the chuck jaws in a plane normal to the axis will also misalign the groove or shoulder machined into the chuck jaws for securing the work piece. Misalignment of the groove or shoulder will cause the work piece not to seat properly. This result is wholly unacceptable in situations requiring close tolerance work.

The use of soft aluminum chuck jaws secured between a collet and the work piece presents a still further problem. The axial distance between the collet member and the point of contact between the work piece and the cutting tool may be great enough to permit the aluminum chuck jaws to bend or distort under pressure of the cutting tool. This problem becomes more prevalent as the chuck jaws become thinned after repeated machining. Any distortion caused thereby will effect the accuracy with which the work piece may be machined.

It is therefore a primary object of the present invention to provide a rigid support for machining work pieces.

Another object of the present invention is to provide an easily machinable segmented ring jaw for supporting a work piece.

Another object of the present invention is to provide a segmented ring jaw requiring a minimum amount of machining to attach a work piece thereto.

Another object of the present invention is to provide a planarly rigid backing plate for supporting segmented ring jaws.

Still another object of the present invention is to provide a plurality of different sized segmented ring jaws attachable to a single planar backing plate.

These and other objects of the present invention will become apparent to those skilled in the art as the description thereof proceeds.

The present invention may be described with more specificity and clarity with reference to the following figures, in which:

FIG. 1 illustrates a lathe incorporating the teachings of the present invention.

FIG. 2 illustrates a cross-sectional view of the present invention.

FIG. 5 illustrates a pair of different sized ring jaws of the present invention.

Figure 3:
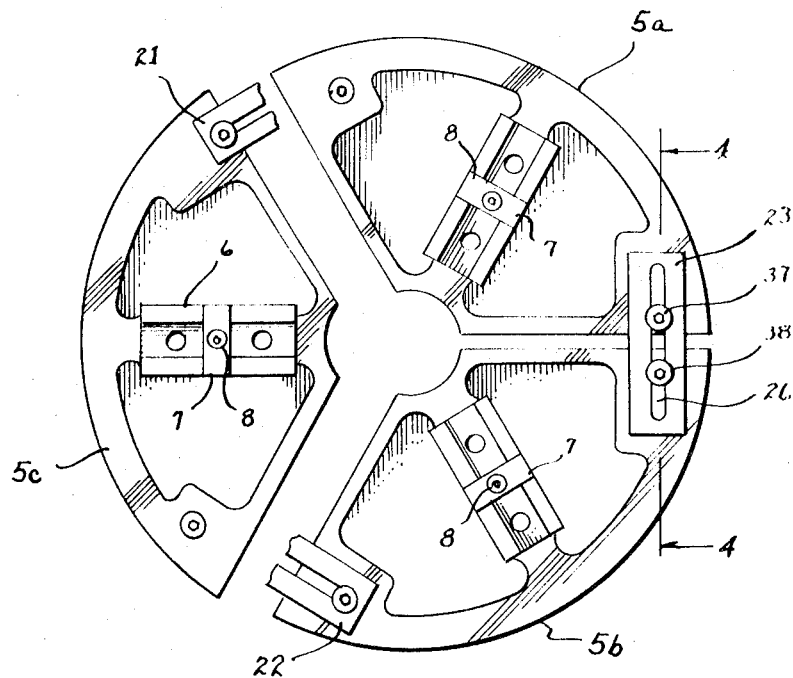
FIG. 3 illustrates the backing plate of the present invention.
Figure 4:
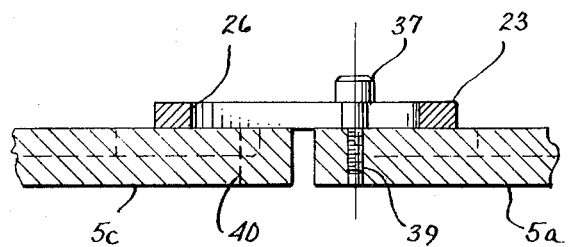
FIG. 4 illustrates a cross section of the backing plate shown in FIG. 3.

Referring to FIG. 1, there is shown a lathe housing 1 having a lathe chuck 2 extending therefrom. Conventional lathes and lathe chucks are well understood in the art and the following description will only touch upon those aspects directly co-operating with the present invention. The lathe chuck 2 has a plurality of jaw mountings 3 extending radially and movable radially toward and away from the axis of rotation of the lathe chuck 2. The radial inward and outward movement of the jaw mountings 3 is controlled by a gearing mechanism which is substantially conventional in all lathe chucks 2 and is controlled by a hand wrench fitting in the wrench receiving socket 4.

In the preferred embodiment of the invention, the backing plate 5 is constructed of three segregable pie-shaped planar members 5a, 5b, and 5c. Each of the members 5a, 5b, and 5c includes a plurality of holes generally radially oriented with respect to each other and generally centered between the radial edges of the member. Each of the members includes an integral assembly 6 which interfaces with the respective jaw mounting in a tongue and groove relationship. Two holes 13, 14 in member 5a are aligned with two threaded holes 17, 18 within jaw mounting 3. Bolts 19, 20 are countersunk in holes 13, 14 and extend therethrough, and are screwed into holes 17, 18 of jaw mounting 3 to firmly secure each member (5a, 5b, 5c) to its respective jaw mounting 3. In addition, a key 7 of hardened material is attached by bolt 8 to the respective member in a channel 9 of assembly 6 and engages channel 10 in jaw mounting 3 to provide not only a friction fit by tightening bolts 19 and 20 but also interlocking physical constraints to prevent any lateral or rotational movement of piece 10 with respect to jaw mounting 3.

Each of the members (5a, 5b, 5c) of backing plate 5 is attachable to the adjacent member through a planar slotted rectangular guide 21, 22, 23. These guides 21, 22, 23 are attached to their respective member 5a, 5b, 5c by bolts, such as bolts 37, 38 extending through the slotted portion and threaded into holes, such as holes 39, 40, in the member. The surface of each member 5a, 5b, 5c adjacent the guide 21, 22, 23 is planar with the guide to provide a firm seating. Thus, on tightening the respective bolts to secure the guides 21, 22, 23 to their respective members 5a, 5b, 5c, a rigid unitary planar structure is formed. By loosening the bolts, the members 5a, 5b, 5c may be moved radially as the slots 24, 25, 26 of the guides 21, 22, 23 compensate for the change in circumferential distance between the bolts of adjacent members 5a, 5b, 5c. Thus, the members may be moved radially inwardly until the sides of the members contact one another and radially outwardly to the extent permitted by the slots 24, 25, 26 in the guides 21, 22, 23. At these extremes, or at any point therebetween, the bolts may be tightened to secure the guides 21, 22, 23 with their respective members and establish a rigid unitary structure. The use of high strength steel for the components of the backing plate 5 and the guides 21, 22, 23 further adds to the rigidity of the unitary structure. If desired, the guides 21, 22, 23 may be keyed to their respective members 5a, 5b, 5c by a tongue and groove arrangement (not shown). With this arrangement, the members 5a, 5b, and 5c will be forced to move radially by equal amounts and it will augment the action of the jaw mountings 3.

In FIGS. 1, 2, and 5, there are shown various views of the ring jaws 27 to be used with the backing plate 5. The ring jaws 27 may be manufactured from aluminum or other easily machinable metal. If desired, they may be manufactured as segments 28, 29, 30 (see FIG. 5) of a ring or as a ring subsequently divided into segments. The width, depth, and radii of the ring jaws 27 may be varied, although the segments may be most useful if they have a radial cross section of generally rectangular shape. FIG. 5 illustrates two differently sized ring jaws that may be mounted on backing plate 5. Each of the members 5a, 5b, and 5c has disposed therein at least two threaded holes 31, 32, each disposed along and centered on an imaginary circle of lesser diameter than the diameter of the backing plate 5. Similarly, a segmented ring jaw 27, having a mean radius equal to the radius of the imaginary circle, has disposed therein a plurality of holes 33, 34 centered on the imaginary circle and aligned with the threaded holes (such as 31, 32) in the backing plate 5. Each of the segments 28, 29, 30 of the ring jaw 27 is affixed to one of the members 5a, 5b, 5c of the backing plate 5 by bolts (such as 35, 36) inserted into the holes 33, 34 in the segment 28 and engaging the respective threaded hole (such as 31, 32) in the respective member. In this manner, the segmented ring jaw 27 is attached to the backing plate 5. For best results, the bolts 35, 36 should be countersunk in the segments and the shafts of the bolts should be in close tolerance with their respective holes to provide a physical as well as a frictional constraint against movement therebetween.

In order to provide a plurality of different sized ring jaws 27 as shown in FIG. 5 for a backing plate 5, a plurality of sets of holes centered on a plurality of different diametered imaginary circles may be disposed in the backing plate 5. Each of these sets of holes would correspond with the holes in a plurality of different diametered ring jaws 27. Thereby, only one backing plate 5 would be needed to mount any segmented ring jaw 27 from a size equivalent in diameter to the inward point of the backing plate members to a size equivalent in diameter to the circumference of the backing plate.

The overall functional aspect of the above-described ring jaws 27 is similar to the functions obtained from the prior art chuck jaws in terms of their role in holding the work piece to be machined. However, there are a myriad of advantages to be obtained from the ring jaws 27 that were not available from the devices of the prior art. These advantages will become obvious from the following discussion of the operation of the instant invention.

An advantage of the invention is that of the feasibility with which the invention may be used on any sized lathe from the smallest to the largest. The diametrical size of the work piece to be worked on a lathe is limited only by the size of the backing plate 5 that can be mounted on the chuck mountings 3. The size of the backing plate 5 is limited by the lathe structure radially closest to the axis of rotation and which would interfere with the rotation of the backing plate 5. Once the largest possible size backing plate 5 has been determined, it may be mounted on the jaw mountings 3. As it represents the largest size work piece that can be machined on that particular lathe, there is no need to ever remove it, except for reasons of maintenance. This represents a substantial time and labor savings over prior known chuck jaws as the latter were continually being used up in terms of continually adapting them to receive new different sized work pieces. An ancillary advantage of the invention is that of extending the life of the mechanism securing the backing plate 5, formerly the chuck jaws, to the rotating shaft of the lathe as they must be loosened and tightened less often.

After a backing plate 5 has been selected and mounted on mountings 3, a segmented ring jaw 27 is selected to be attached thereto. The selection of the size of the ring jaw 27 should be controlled by the following criteria. The ring jaw 27 should be selected so that either its inside or outside diameter most closely approaches the diameter of the work piece portion which is to be mounted thereon. In this manner, the least amount of material needs to be removed from the ring jaw 27 in preparing it to accept the work piece. This presents a substantial setting up time savings and a substantial economy in discarded material costs.

Afer selecting the appropriate sized ring jaw 27, each segment 28, 29, 30 is mounted on a backing plate member 5a, 5b, 5c and secured thereto by bolts, such as 35, 36. The ring jaw 27 is then machined to provide the requisite seating for the work piece. On completion thereof, the guides 21, 22, 23 are loosened and the backing plate members 5a, 5b, 5c are drawn inwardly slightly or extended outwardly slightly, depending on whether the work piece is fitted onto the ring jaws in an inside or outside diameter configuration by turning socket 4. This permits the work piece to be fitted onto the ring jaw 27. The work piece is then secured to the ring jaw 27 by reversely moving the backing plate members 5a, 5b, 5c until a snug fit is obtained between the ring jaw 27 and the work piece. The guides 21, 22, 23 are tightened by their respective bolts to securely tie the backing plate members 5a, 5b, 5c to one another and thereby form a rigid unitary mounting for the work piece. The work piece may now be machined. To remove the work piece, the guides 21, 22, 23 are loosened and the members 5a, 5b, and 5c are moved radially to disengage the ring jaw 27 from the work piece.

In situations where the work piece is of very hard and difficult to machine metal, the radial force exerted by the jaws securing the work piece has to be substantial to provide the requisite frictional force to prevent the work piece from rotating under the forces of the cutting tool. This situation establishes substantial counter forces that are axially displaced, causing possible deformation of the jaws, such as the aluminum pie jaws used in the prior art. Any such deformation will misalign the seating machined in the jaws and subject the work piece to uneven forces. Accurate high tolerance of the work piece is then impossible. The problem became even more severe after the pie-shaped chuck jaws were thinned due to repeated machining to fit various sized work pieces thereon.

In the present invention, the above-described distortion is avoided for all practical purposes. The design of the backing plate 5 is such that it may be made of high strength steel and by use of the guides 21, 22, 23 presents a rigid planar unitary structure not subject to deformation under any expected loads. The ring jaws 27, though usually made from aluminum and less rigid than steel, are securely fastened to the backing plate members 5a, 5b, 5c. The steel bolts 35, 36, being in close tolerance with the holes 33, 34 in the segments 28, 29, 30, lends rigidity to the jaw 27. The axial distance between the heads of the bolts and the work piece is very small and thus presents a minimum leverage arm through which the previously discussed counter forces may act. Thus, the possibility of the ring jaw 27 securing the work piece to a lathe, as described in the instant invention, being subjected to distortion is at a minimum. To reduce the possibility to practically zero for even ultra-hard work pieces, the ring jaw 27 may be made of steel rather than aluminum. For extended runs, two sets of ring jaws arranged in an overlapping relationship may be used. Fantastic rigidity is obtained thereby, yet only one set of ring jaws need to be machined and the second set may be used for other machining operations later on. The expense of machining steel ring jaws is also avoided.

In many applications, dish-shaped work pieces must be machined. The instant invention admirably lends itself to this situation. Here, a ring jaw size is selected which will engage the periphery of the work piece at or close to the ring jaw 27 inner diameter. Thus, the set-up time previously required to machine out pie-shaped jaws to provide a recess for the dished portion is completely obviated. This represents a substantial savings in the cost of the machinist's time, lathe time, and aluminum.

In some machining operations, there is a requirement to work a flange at the inner diameter of the work piece. In the previously used pie-shaped aluminum chuck jaws, the jaws had to be machined to provide a recess to permit the cutting tool to be inserted therein before the work piece could be machined. This operation was a substantial portion of the set-up time required and added to the overall cost of the machining process. With the instant invention, the above-required set-up time is wholly avoided as the ring jaw 27 automatically provides a sufficient recess to insert a cutting tool therein.

The cost of either pie-shaped chuck jaws or ring jaws is basically on a dollar per pound basis. Obviously, the less weight that must be machined away to fit a work piece onto the jaws the lower is the cost of the machining operation. With the use of the ring jaw 27, the excess material that must be machined away is at a minimum and substantially reduces the costs of any machining operation. In example, the cost comparisons obtained over a period of time have been in the neighborhood of ten to one.

I claim:

1. Apparatus for mounting a work piece on a lathe, which lathe includes a self-centering chuck and chuck jaws, said apparatus comprising in combination:
   a. a multimembered planar backing plate;
   b. attachment means for attaching one side of each member of said plate to one of the chuck jaws;
   c. lock means for selectively securing adjacent ones of said members in a rigid planar relationship with respect to one another, said lock means being positioned radially external to the perimeter of the chuck;
   d. a segmented ring having a plurality of arcuate segments, each of said segments being anchored to another side of one of said members to form said segmented ring; and
   e. receiving means disposed on each of said segments for engaging a portion of the work piece; whereby the work piece, positioned within said receiving means, is secured to the lathe by radially displacing the chuck jaws to draw said receiving means firmly against the work piece.

2. The apparatus as claimed in claim 1, wherein said multimembered planar backing plate comprises three pie-shaped members.

3. The apparatus as claimed in claim 2, wherein said lock means comprises a slotted rectangular piece and at least one pair of bolts extending through the slot, each bolt of said pair threadedly engaging a different one of adjacent ones of said members, whereby on tightening said bolts said adjacent members are rigidly displaced with respect to one another by said slotted piece.

4. The apparatus as claimed in claim 2, wherein said segmented ring comprises three segments, each one of said segments extending arcuately to either radial edge of the member to which it is attached.

5. The apparatus as claimed in claim 1, wherein each of said members are non-movably attached to its respective chuck jaw by bolts and each of said segments is non-movably attached to its respective member by bolts.

6. The apparatus as claimed in claim 3, wherein said lock means is positioned in proximity to the perimeter of said multimembered plate.

* * * * *